(12) United States Patent
Milstein et al.

(10) Patent No.: US 7,720,681 B2
(45) Date of Patent: May 18, 2010

(54) DIGITAL VOICE PROFILES

(75) Inventors: David Milstein, Redmond, WA (US); Kuansan Wang, Bellevue, WA (US); Linda Criddle, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 11/387,493

(22) Filed: Mar. 23, 2006

(65) Prior Publication Data

US 2007/0225984 A1    Sep. 27, 2007

(51) Int. Cl.
*G10L 15/26* (2006.01)
*G10L 11/06* (2006.01)
*G10L 21/02* (2006.01)
*G10L 21/00* (2006.01)

(52) U.S. Cl. ............... 704/244; 704/210; 704/215; 704/227; 704/243; 704/270

(58) Field of Classification Search .............. None
See application file for complete search history.

(56) References Cited

U.S. PATENT DOCUMENTS

| | | | | |
|---|---|---|---|---|
| 5,602,962 A * | 2/1997 | Kellermann | ............... | 704/226 |
| 6,463,413 B1 * | 10/2002 | Applebaum et al. | ...... | 704/256.2 |
| 6,618,701 B2 * | 9/2003 | Piket et al. | ............... | 704/233 |
| 6,823,312 B2 * | 11/2004 | Mittal et al. | ............... | 704/271 |
| 6,910,011 B1 * | 6/2005 | Zakarauskas | ............... | 704/233 |
| 7,373,297 B2 * | 5/2008 | Habermas et al. | ............ | 704/233 |
| 7,519,536 B2 * | 4/2009 | Maes et al. | ............... | 704/270.1 |
| 2002/0138274 A1 * | 9/2002 | Sharma et al. | ............... | 704/270 |
| 2004/0002858 A1 * | 1/2004 | Attias et al. | ............... | 704/226 |
| 2005/0015252 A1 * | 1/2005 | Marumoto | ............... | 704/234 |
| 2005/0182626 A1 * | 8/2005 | Kim et al. | ............... | 704/245 |
| 2006/0058999 A1 * | 3/2006 | Barker et al. | ............... | 704/256 |
| 2006/0136203 A1 * | 6/2006 | Ichikawa | ............... | 704/226 |

* cited by examiner

*Primary Examiner*—Matthew J Sked
(74) *Attorney, Agent, or Firm*—Merchant & Gould, P.C.

(57) ABSTRACT

Generally described, the present invention is directed toward generating, maintaining, updating, and applying digital voice profiles. Voice profiles may be generated for individuals. The voice profiles include information that is unique to each individual and which may be applied to digital representations of that individual's voice to improve the quality of a transmitted digital representation of that individual's voice. A voice profile may include, but is not limited to, basic information about the individual, and filter definitions relating to the individuals voice patters, such as a frequency range and amplitude range. The voice profile may also include a speech definition that includes digital representations of the individual's unique speech patterns.

20 Claims, 17 Drawing Sheets

DIGITAL VOICE PROFILES

BACKGROUND

Generally described, an Internet telephony system provides an opportunity for users to have a call connection with enhanced calling features compared to a conventional telephony system. In a typical Internet telephony system, often referred to as Voice over Internet Protocol (VoIP), audio information is processed into a sequence of equal sized data blocks, called packets, for communications utilizing an Internet Protocol (IP) data network. During a VoIP call conversation, the voice is converted into small frames of voice data according to a network layer protocol used in the IP data network and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, current VoIP approaches may not provide the ability to automatically remove unwanted background noise and improve speech quality of a communication.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect, a computer-readable medium having computer executable components for creating a voice profile and maintaining a voice profile is provided. The computer-readable medium includes, among other items, a speech data collection component, a filter definitions component, a speech analysis component and a voice profile management component. The speech data component is configured to collect data packets containing digital representations of speech. The filter definitions component utilizes information contained in the collected data packets to develop filter definitions for removing unwanted audio, such as noise. The filters may be, for example, a frequency range filter and an amplitude range filter. The speech analysis component analyzes the digital representations of speech contained in the data packets and generates a speech definition representative of the digital representations of speech. The voice profile management component generates a voice profile based on the filter definitions and the generated speech definition.

In accordance with another aspect, a method for improving digitally transmitted speech is provided. The method includes selecting a voice profile for use in improving the digitally transmitted speech and improving received digitally transmitted speech by applying the selected voice profile. In one example, the digitally transmitted speech may be improved by initially filtering out undesirable audio and then improving the digitally represented speech through the use of a speech definition that is maintained in the voice profile.

In accordance with another aspect of the present invention, a method for updating a voice profile is provided. The method includes selecting a voice profile containing a speech definition and collecting data packets containing digital representations of speech. The collected data packets are used to develop another speech definition based on the digital representations of speech. The two speech definitions may then be merged, or averaged, to generate a compiled speech definition that may be used to improve the quality of incoming digital representations of speech.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention provides the ability to process audio information that is exchanged over a digital communication channel. More specifically, the present invention creates and maintains voice profiles for individuals that may be shared and used to filter out undesirable noise and to improve the quality of a conversation. Although the present invention will be described in connection with a VoIP telephone environment, it is equally applicable to any type of digital data exchange that includes audio (speech). Accordingly, the disclosed embodiments and examples are illustrative in nature and should not be construed as limiting.

Figure 1:
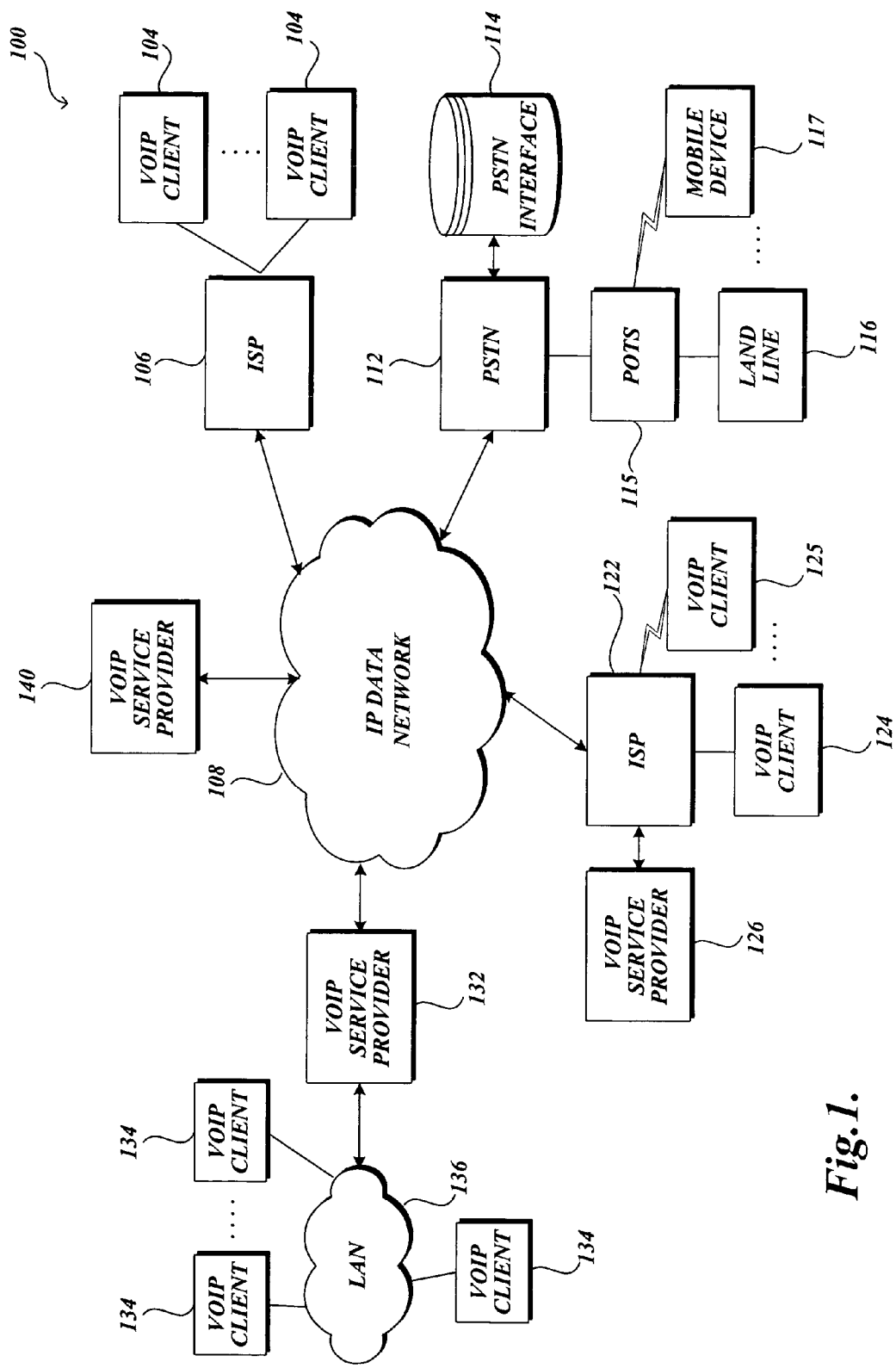
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices, and a unique VoIP client identifier. For example, a single individual, five associated VoIP devices, and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a telephone system to reach the contact point of the VoIP client.

Generally described, the IP telephony environment 100 may include an IP data network 108, such as an Internet network and/or an intranet network, and VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company). More specifically, the contextual information may include information relating to "voice profiles" associated with the contact points and/or the individuals utilizing the VoIP devices.

A "voice profile," as used herein, is a collection of information specifying the tonal and phonetic characteristics of an individual. For example, a voice profile may include a frequency range and amplitude range in which an individual speaks. A voice profile may also include one or more speech definitions specifying the digital representation of the individual voice patterns. Because individuals have unique speech characteristics, each individual's voice profile will be unique. Similarly, because different people hear individuals differently, different voice profiles for the same individual may be generated by the individual with whom they speak. Still further, different voice profiles may be generated for the same individual by the same client. For example, each client device may maintain different voice profiles for the same individual. Likewise, an individual may generate several voice profiles for themselves, one for each device and/or particular locations. A shared voice profile, which may be a reduced set of information compared to a voice profile, may be generated for transmission from one VoIP client to others. An example structure and contents of a voice profile and a shared voice profile is discussed in further detail with respect to FIGS. 13A and 13B.

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. The VoIP service providers 126, 132, 140 may also generate, maintain, and provide voice profiles for individuals communicating in a call conversation. As an alternative, or in addition thereto, VoIP clients 104, 124, 125, 136 may create, maintain, and provide voice profiles.

VoIP service providers 132 may be coupled to a private network, such as a company LAN 136, providing IP telephone services (e.g., internal calls within the private network, external calls outside of the private network, and the like), and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a Public Switch Telephone Network (PSTN) 112. A PSTN interface 114, such as a PSTN gateway, may provide access between PSTN and the IP data network 108. The PSTN interface 114 may translate VoIP data packets into circuit switched voice traffic for PSTN and vice versa. The POTS 115 may include a land line device 116, a mobile device 117, and the like.

POTS devices, such as land line 116, may request a connection with the VoIP client based on the unique VoIP identifier of that client and the appropriate VoIP device associated with the client will be used to establish a connection. In one example, an individual associated with the VoIP client may specify which device is to be used in connecting a call based on a variety of conditions (e.g., connection based on the calling party, the time of day, etc.)

Figure 2:
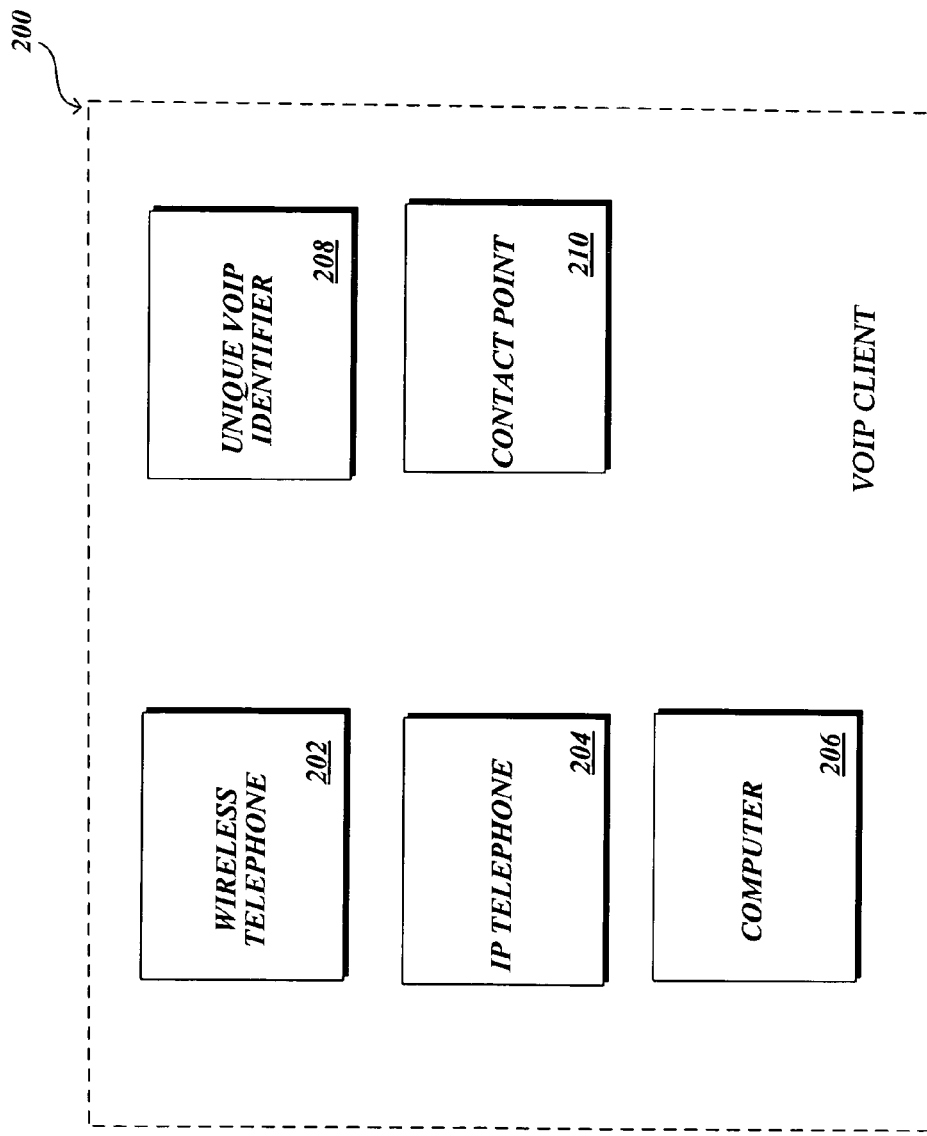
FIG. 2 is a block diagram illustrative of a VoIP client, in accordance with an aspect of the present invention.

Referring now to FIG. 2, a block diagram illustrating an exemplary VoIP client 200 that includes several VoIP devices and a unique VoIP identifier in accordance with an embodiment of the present invention is shown. Each VoIP device 202, 204, 206 may include a storage that is used to maintain voice messages, address books, client specified rules, voice profiles, etc. Alternatively, or in addition thereto, a separate storage, maintained for example by a service provider, may be associated with the VoIP client and accessible by each VoIP device. The separate storage may contain information relating to the VoIP client, such as voice profiles, client specified rules, etc. The VoIP client 200 also includes a unique VoIP identifier 208. This unique VoIP identifier is used to identify the client and to connect with the contact point 210 associated with the VoIP client via on of the devices. The unique VoIP identifier may be maintained on each VoIP device included in the VoIP client, maintained in the separate storage, and/or maintained by a service provider that includes an association with each VoIP device included in the VoIP client. In the instance in which the unique VoIP identifier is maintained by a service provider, the service provide may include information about each associated VoIP device and knowledge as to which device(s) to connect for incoming communications.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, that is associated with the VoIP client. Based on the arrangement of the client, the appropriate device(s) will be used to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
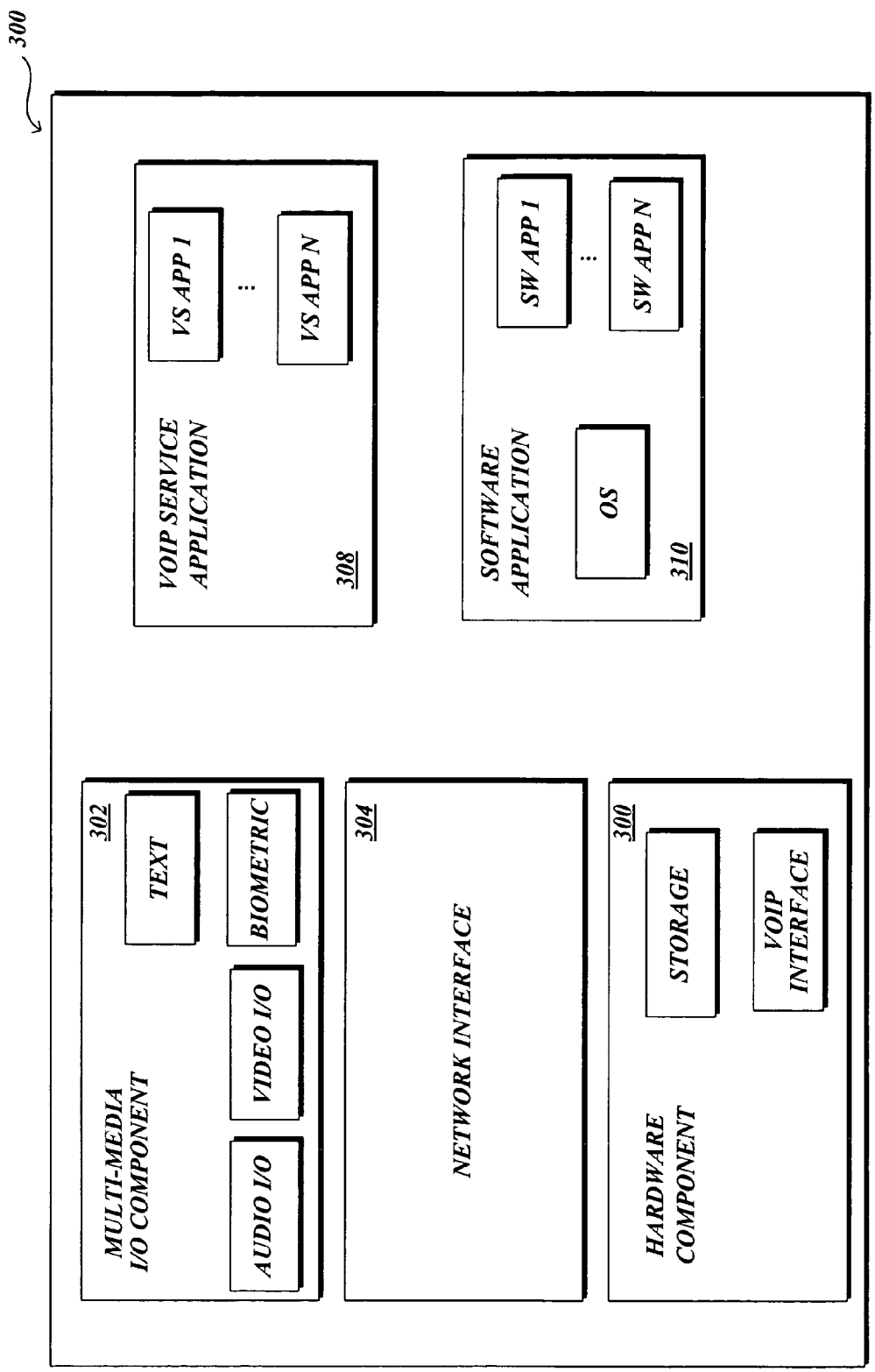
FIG. 3 is a block diagram illustrative of various components associated with a VoIP device, in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, display screen, a keyboard, user biometric recognition devices and the like. The network interface component 304 may support interfaces such as Ethernet interfaces, frame relay interfaces, cable interfaces, DSL interfaces, token ring interfaces, radio frequency (air interfaces), and the like. The device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles) associated with the VoIP client in which the device is included. In one embodiment, the hardware component 306 may include a VoIP interface card which allows non-VoIP devices to operate like a VoIP device.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio. Alternatively, a separate application may be dedicated to filtering and improving incoming audio using voice profiles. Another application may be provided that collects samples of audio data for use in updating stored voice profiles. The software application component 310 may include an operating system and other software applications such as a Web browser application, user interface control application, and the like.

Figure 4A:
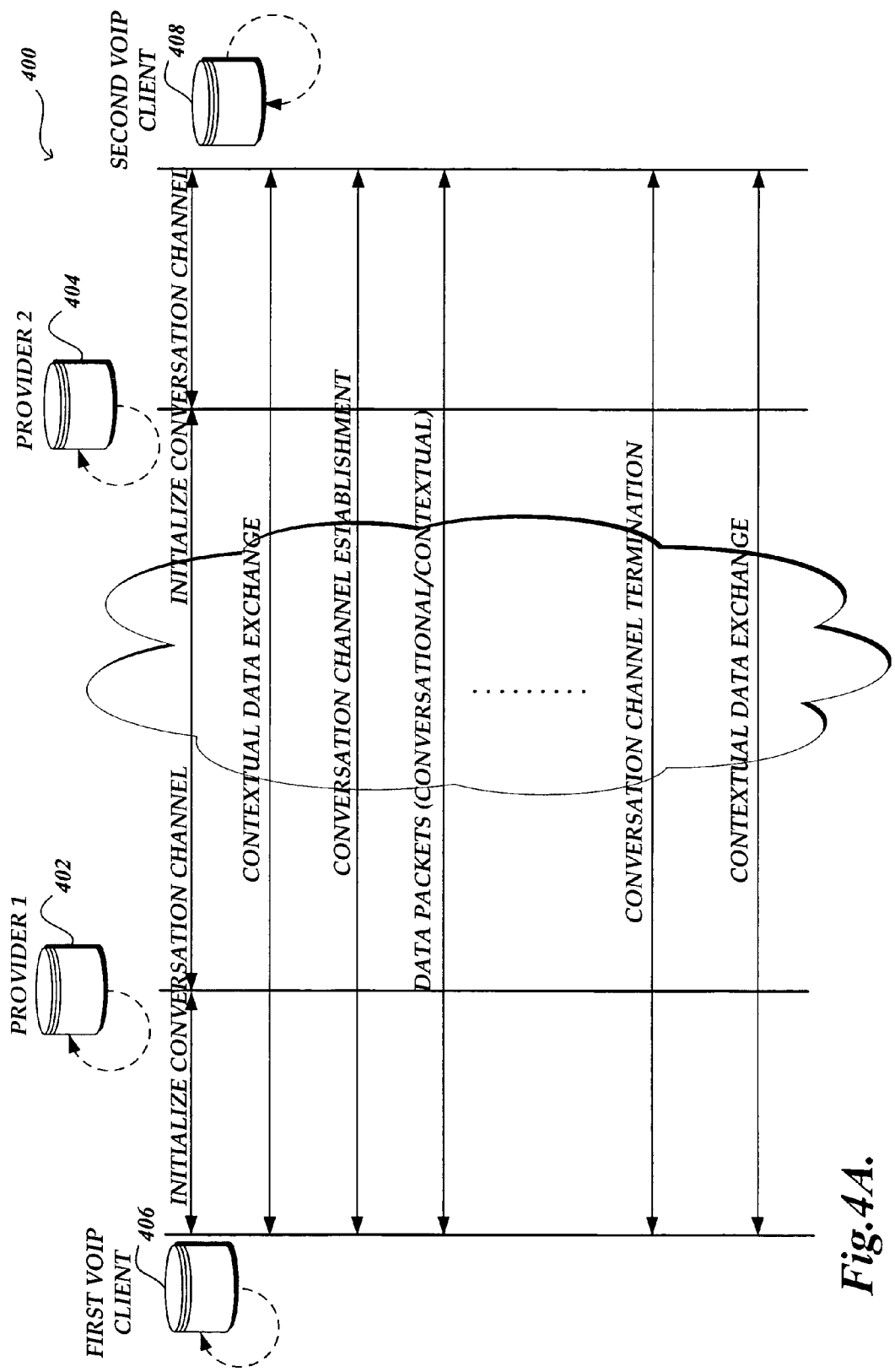
FIGS. 4A and 4B are block diagrams illustrative of the exchange of data between devices of two VoIP clients over a conversation channel, in accordance with an aspect of the present invention.

With reference to FIG. 4A, a block diagram illustrative of a conversation flow 400 between VoIP devices of two different VoIP clients over a conversation channel in accordance with an embodiment of the present invention is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers, any number and combination of service providers may be used with embodiments of the present invention. For example, only one service provider may be utilized in establishing the connection. In yet another example, communication between VoIP devices may be direct, thereby eliminating the need for a VoIP service provider.

There are a variety of protocols that may be selected for use in exchanging information between VoIP clients, VoIP devices, and/or VoIP service providers. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only include one VoIP device. Accordingly, the discussion provided herein will refer to connection of the two VoIP devices. The individual using the device of the first VoIP client 406 may select or enter the unique VoIP identifier of the client that is to be called (second VoIP client 408). Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure to be used. In one embodiment, the exchanged contextual information may include information relating to the calling client 406, the device, the contact points, and the client 408 being called. For example, the contextual information sent from the calling VoIP client 406 may include the voice profile of an individual (e.g., contact point) associated with the VoIP client 406 that is making the call, an identifier of that voice profile, an identifier or identifiers of stored versions of the voice profile associated with the contact point being called, etc.

Available media types, rules of the calling client and the client being called, and the like, may also be part of the contextual information that is exchanged during the connection set-up phase. The contextual information may be processed and collected by one of the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or reject the request via Provider 2 404. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after termination of a conversation.

Figure 4B:
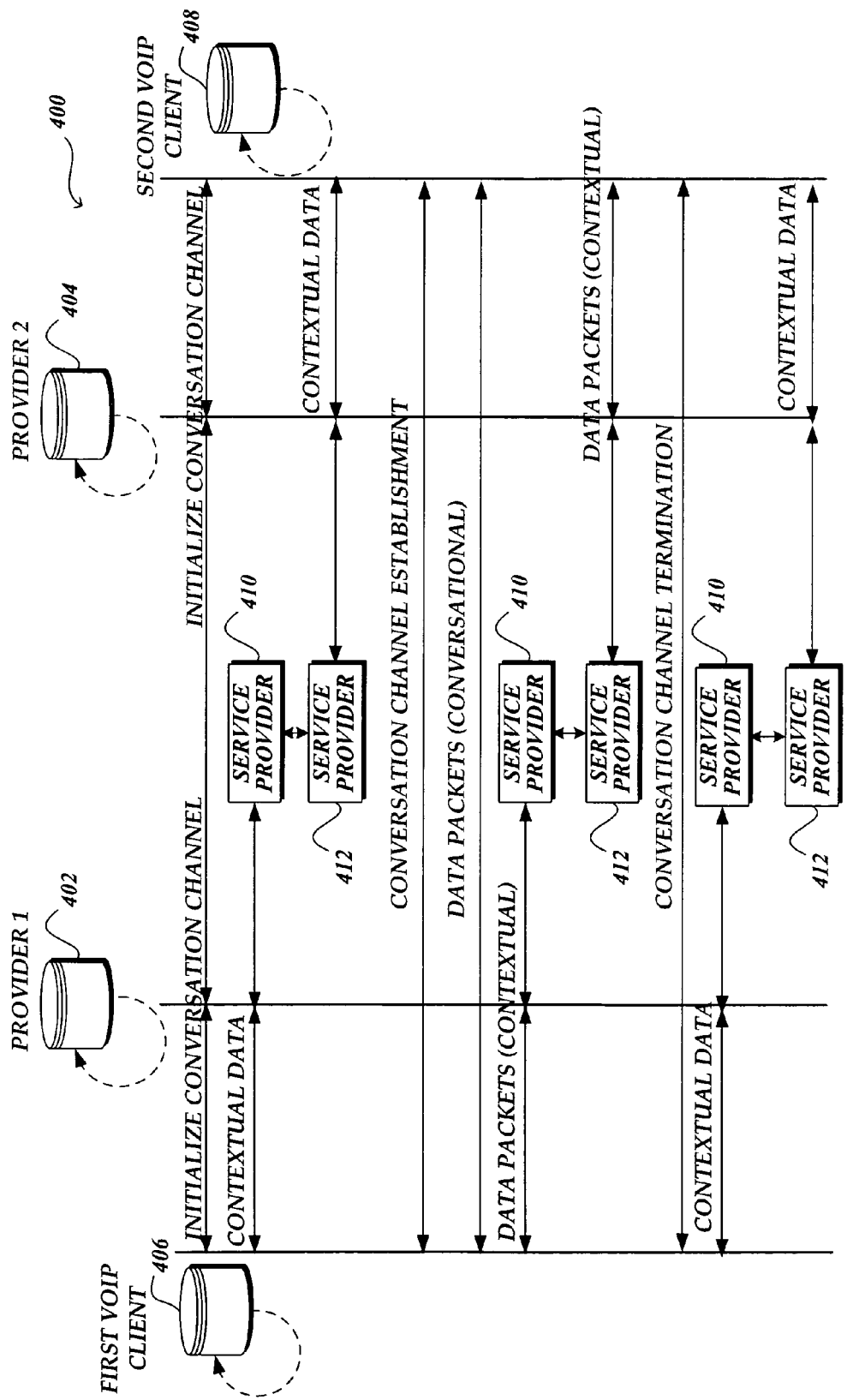

FIG. 4B is a block diagram illustrative of a conversation flow 400 between devices of two VoIP clients via several service providers in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

Similar to FIG. 4A, the exchanged contextual information may include information relating to the contact point associated with the VoIP client 406, such as an individual's voice profile, etc. The contextual information may be processed and collected at a device of the first VoIP client, a device of the second VoIP client, and/or the VoIP service providers (e.g., Provider 1 and Provider 2), depending on the nature of the contextual information. For example, voice profiles may be collected by the service providers 402, 404, and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify, and/or delete contextual information before forwarding the contextual information to the next VoIP device(s), including other service providers. For example, any of Provider 1 402, Provider 2 404, or third party SP 410, 412 may identify the contact points (or specific individuals in the instance in which the contact point is not a specific individual) and provide the appropriate voice profiles for each individual for use during the conversation. If the voice profiles are designated for temporary use only, upon termination of the conversation, the voice profiles may be removed from the client devices to ensure security of each individual and to free-up space on the devices.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
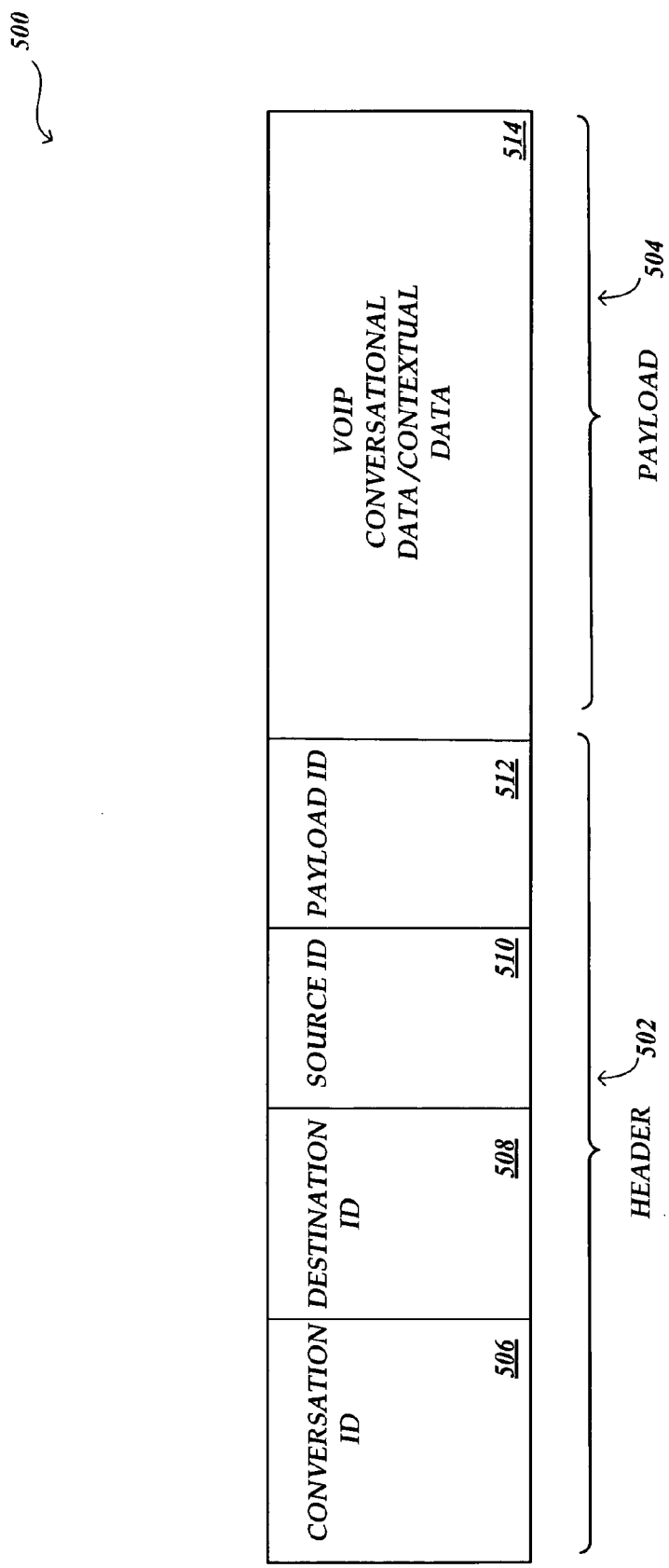
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). The data packet structure 500 includes a header 502 and a payload 504. The header 502 may contain information necessary to deliver the corresponding data packet to a destination. Additionally, the header 502 may include information utilized in the process of a conversation. Such information may include a conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying the payload type (e.g., conversation or contextual), individual ID (not shown) for identifying the individual for which the conversation data is related, and the like. In an alternative embodiment, the header 502 may contain information regarding Internet protocol versions and payload length, among others. The payload 504 may include conversational or contextual data relating to an identified conversation. As will be appreciated by one of ordinary skill in the art, additional headers may be used for upper layer headers such as a TCP header, a UDP hearer, and the like.

Figure 6A:
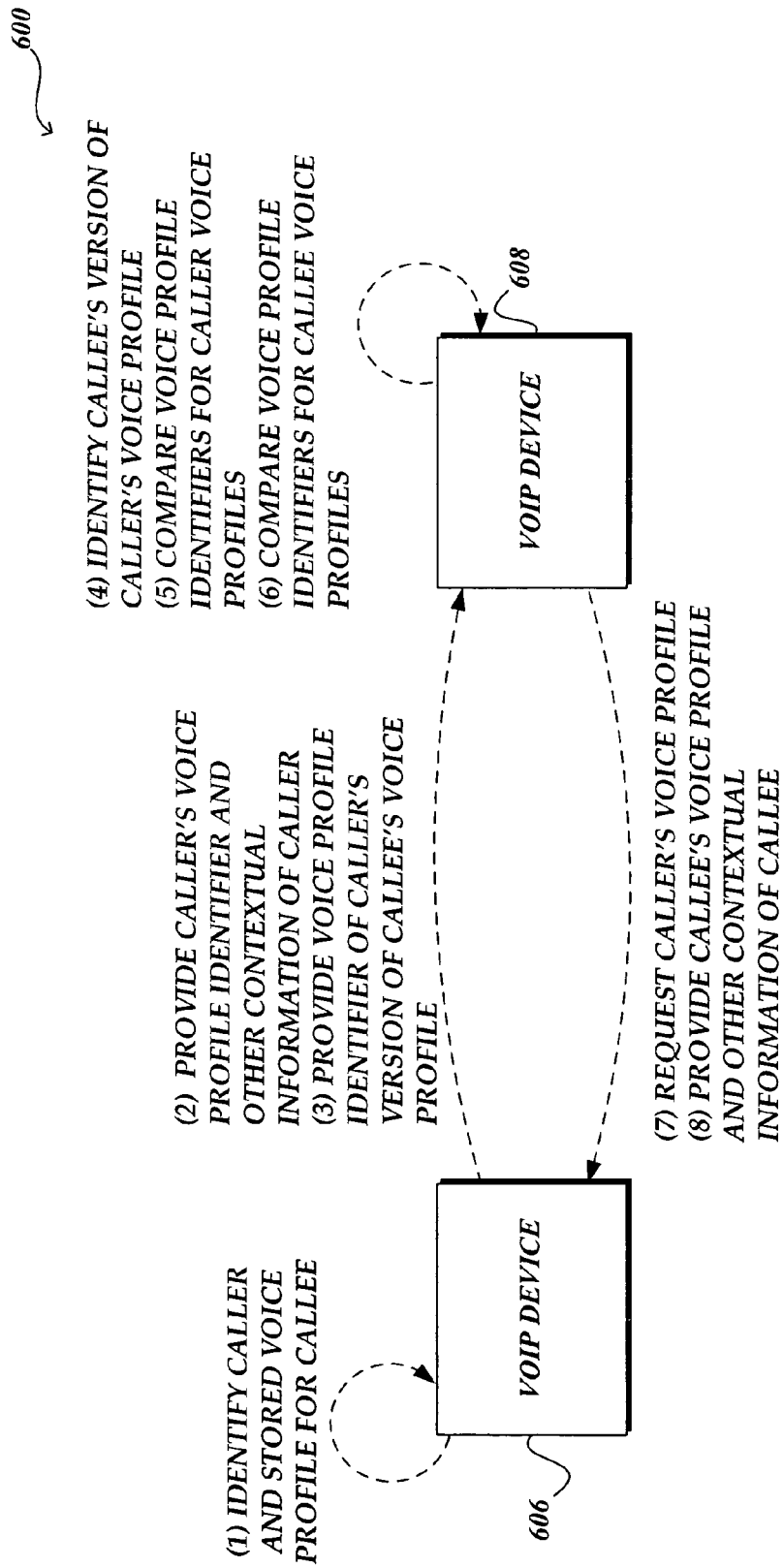
FIGS. 6A and 6B are block diagrams illustrating interactions between devices of two VoIP clients for transferring contextual information, in accordance with an aspect of the present invention.
Figure 6B:
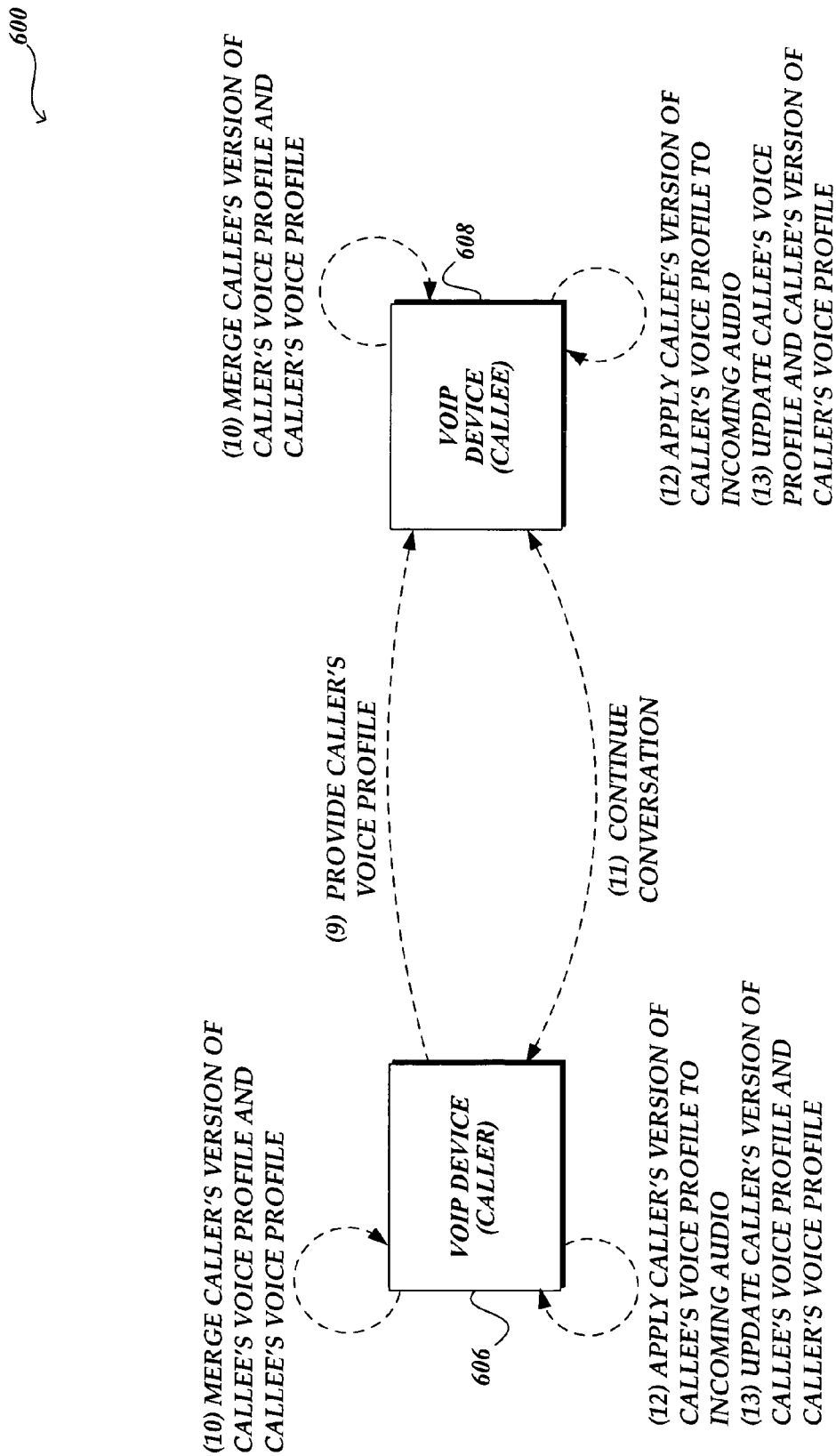

FIGS. 6A and 6B are block diagrams illustrating the exchange, selection, and management of voice profiles between two VoIP devices in accordance with an embodiment of the present invention. The exchange, selection, and management of voice profiles between two VoIP devices may occur during a conversation channel setup or during a conversation. Additionally, as discussed below, management and/or exchange of voice profiles may be done independent of a call connection. For purposes of this example, the process will be described in which an individual (referred to as the caller) is using VoIP device 606 to establish a connection with a second individual (referred to as the callee) that uses VoIP device 608.

At an initial point, either at initiation of the communication or after the communication channel has been established between the caller's VoIP device 606 and the callee's VoIP device 608, the caller's VoIP device 606 identifies the caller. Identification of a caller may be accomplished in a variety of ways. For example, the caller's VoIP device 606 may be a dedicated device that is only used by the caller, and thus the caller is automatically known. If the device is only associated with one client and the contact point for the client is an individual, the caller can be assumed to be the individual.

Alternatively, the caller's VoIP device 606 may request that the caller provide identification. Identification may be provided by, for example, selecting from a preassigned list of individuals maintained on the VoIP device 606, utilizing speech recognition, providing a personal identification code, providing biometrics, etc. In the instance where a VoIP communication is currently established between a caller and a callee, the VoIP device 606 may sample voice data from the caller to identify the caller.

In addition, the caller's VoIP device 606 may also identify the callee. Identification of the callee may be accomplished by, for example, identifying the individual associated with unique VoIP identifier called, receiving an indication from the caller, sampling audio being received from the callee, receiving a callee identification from the callee's VoIP device 608, etc.

Upon identification of the caller and the callee, the caller's VoIP device 606 provides the caller's voice profile identifier and other contextual information relating to the call, the device, and/or the caller. A voice profile identifier, as used herein, is any type of identifier that specifies the individual associated with a voice profile and a version/save date of the voice profile being identified. The VoIP device 606 may also provide a voice profiler identifier for a caller's version of the callee's voice profile, if one exists on the caller's VoIP device 606 or is maintained by the client associated with the caller. As discussed above, multiple voice profiles may exist for a single individual, such as a callee. For example, a caller may generate one or more voice profiles of an individual based on what the caller believes to be accurate representations of the callee's speech. In contrast, the callee may create their own voice profile based on what they believe to be accurate representations of their speech. These profiles may be different even though they represent the same individual.

Referring to the callee's VoIP device 608, upon receipt of the caller's voice profile identifier and the identifier of the caller's version of callee's voice profile, the callee's VoIP device 608 determines if a callee's version of the caller's voice profile exists. If one exists, the identifier of the callee's version of the caller's voice profile is compared with the received caller's voice profile identifier to determine if the callee's version of the caller's voice profile is current. As discussed below, if the voice profile to be used on incoming speech, in this example the callee's version of the caller's voice profile, is not current, the callee's VoIP device 608 may request a shared version of the caller's voice profile. If there is no existing profile stored on the callee's VoIP device 608, the callee's VoIP device 608 may request a shared version of the caller's voice profile from the caller's VoIP device 606.

In addition to comparing the identifier of a callee's version of the caller's voice profile with the received caller's voice profile identifier, the callee's VoIP device 608 compares the received identifier of the caller's version of the callee's voice profile with the callee's shared voice profile to determine if the caller has a current version of the callee's voice profile. Upon comparison of the identifiers, if it is determined that the caller's VoIP device 608 does not have a current version of the callee's voice profile, the callee's VoIP device 608 provides to the caller's VoIP device 606 a shared version of the callee's voice profile. Likewise, if the caller's VoIP device 606 does not include a voice profile of the callee, the callee's device 608 provides a shared version of the callee's voice profile.

Referring to FIG. 6B, upon receipt of a request at the caller's VoIP device 606 for a shared version of the caller's voice profile, the caller's VoIP device 606 provides to the callee's VoIP device 608 a shared version of the caller's voice profile. Additionally, upon receipt at the caller's VoIP device 606 of a callee's shared voice profile, the caller's VoIP device 606 merges the caller's version of the callee's voice profile with the received callee's shared voice profile to create a new caller's version of the callee's voice profile. Merging of profiles is described in more detail below with respect to FIG. 11. Likewise, the callee's VoIP device 608, upon receipt of the caller's shared voice profile, merges the callee's version of the caller's voice profile and the received caller's shared voice profile to create a new callee's version of the caller's voice profile.

Upon merging and/or selection of voice profiles for both the caller and the callee, the conversation between the two parties is continued and the caller's version of the callee's voice profile is applied to data packets received by the caller's device 606 that include speech from the callee. Likewise, the callee's version of the caller's voice profile is applied to data packets received by the callee's device 608 that include speech from the caller. Incoming speech data packets received at either device are filtered and the audio is improved using the selected voice profiles. For example, the caller's VoIP device 606, upon receipt of speech data from the callee's device 608, filters and improves the speech contained in those data packets using information obtained from the caller's version of the callee's voice profile. Likewise, speech data received by the callee's VoIP device 608 is filtered and improved using the callee's version of the caller's voice profile.

While the above example automatically applies voice profiles to incoming speech, in an alternative embodiment, a caller or callee may manually select whether the voice profile is to be applied to incoming speech. Additionally, instead of exchanging voice profiles or voice profile identifiers, if each party has a current voice profile, it may be selected by identifying the caller based on, for example, caller identification, or other types of contextual information that are unique to the caller.

As discussed herein, multiple versions of voice profiles may be generated and maintained for a single individual. However, embodiments of the present invention may also be envisioned in which a single voice profile is generated and applied for each individual. Referring to the example above, the caller's voice profile may be used by the callee's device 608 to filter the incoming audio information received from the caller, instead of utilizing a callee's version of the caller's voice profile. In such an embodiment, it may still be determined whether the respective parties have current versions of the profiles and if not, the voice profiles may simply be replaced with current versions.

In addition to filtering and improving audio data received from the different devices using voice profiles, both the caller's VoIP device 606 and the callee's VoIP device 608 may constantly sample speech data that is being received and update the voice profiles of both the caller and the callee by processing the sampled data. Sampled data may be obtained either before or after correction using a voice profile.

As described in more detail below, updating of voice profiles may be done in an active manner (e.g., upon selection by a user of audio that is to be sampled) or in the background by intermittent selection of audio samples. For example, if a caller is in a quiet room and believes that speech provided by the caller will be good for use in updating the caller's own voice profile, the caller may notify the caller's VoIP device 606 to sample the speech data that is being provided by the caller and update the caller's voice profile using that data. Similarly, the caller, upon receiving speech data from the callee may determine that the received data is very clear and representative of the callee's actual voice and notify the caller's VoIP device 606 to use the received audio data for updating the caller's version of the callee's voice profile. In updating voice profiles, actively sampled speech data may be given more weight when updating the voice profile than background sampled data.

Figure 7A:
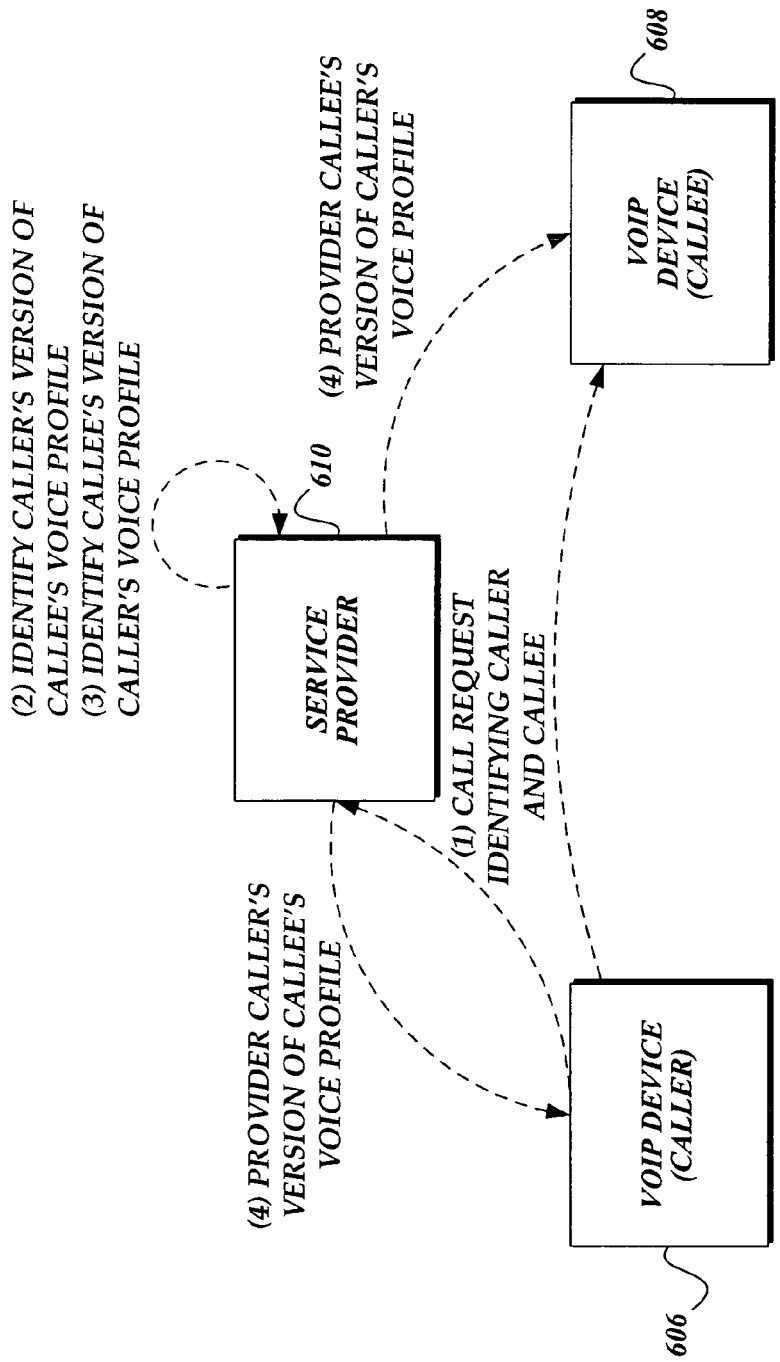
FIGS. 7A-7C are block diagrams illustrating the exchange, selection, and updating of voice profiles between a caller's device and a callee's device in which the profiles are maintained by a separate service provider in accordance with the embodiment of the present invention.
Figure 7B:
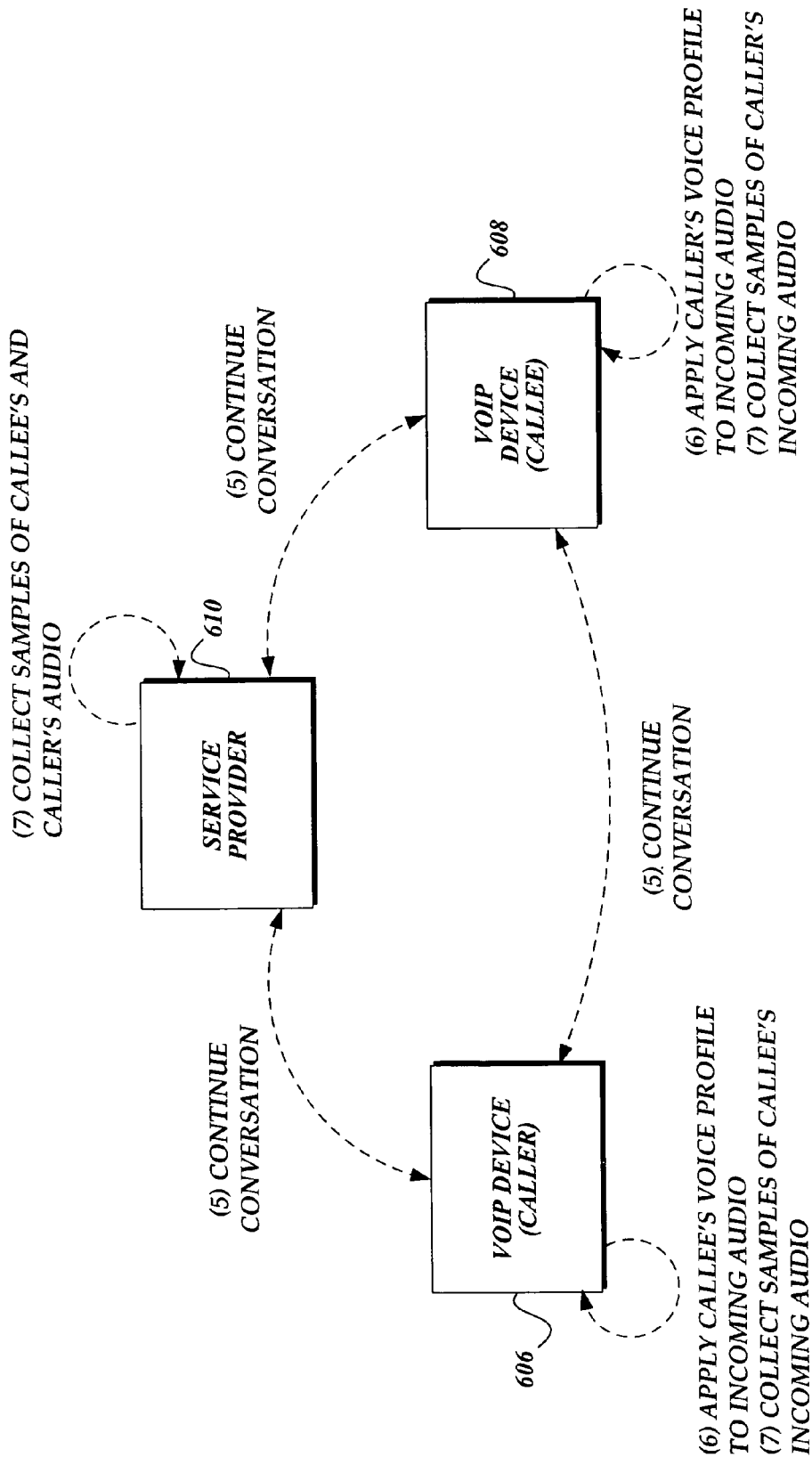
Figure 7C:
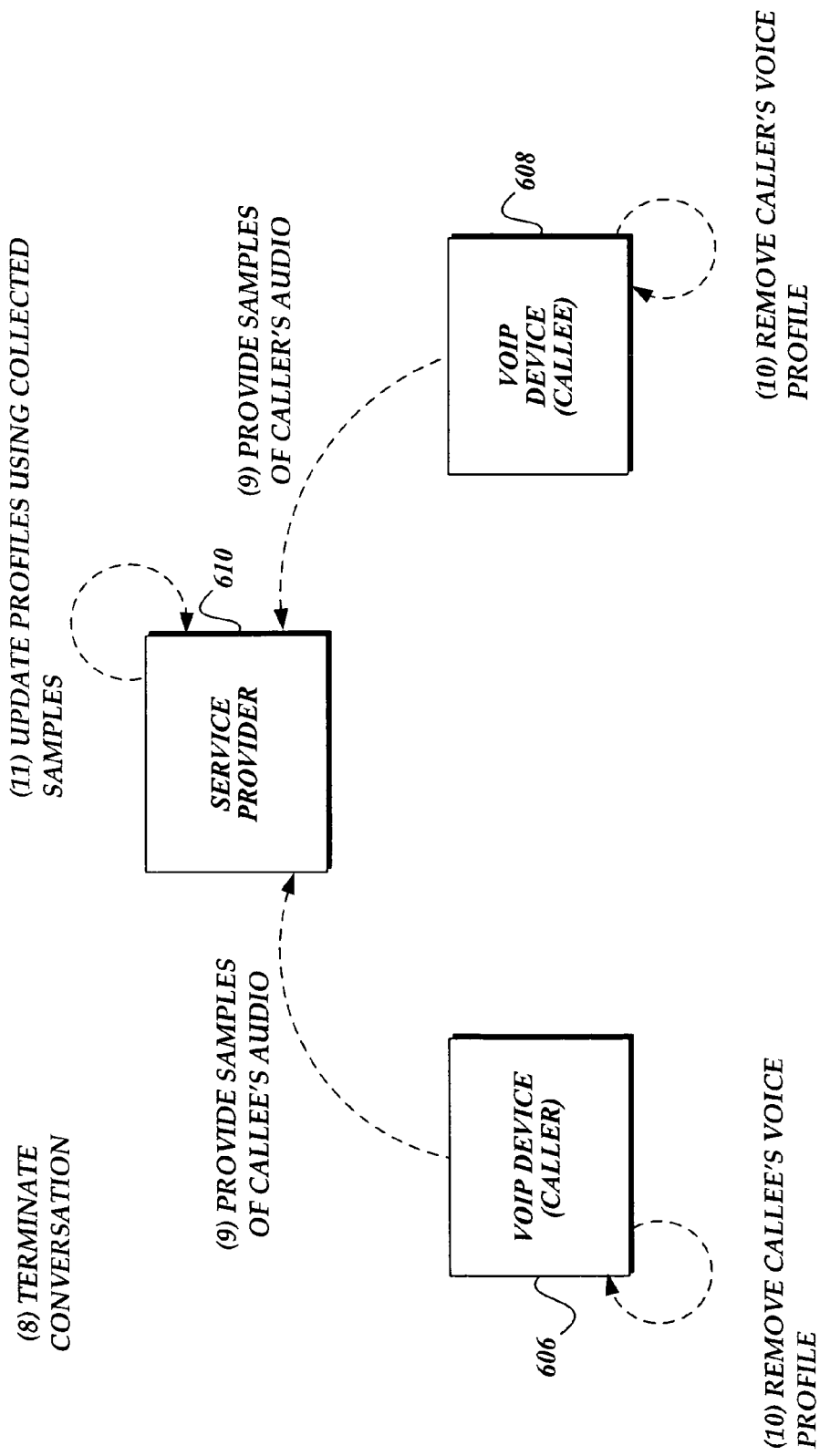

FIGS. 7A-7C are block diagrams illustrating the exchange, selection, and updating of voice profiles between a caller's device and a callee's device in which the profiles are maintained by a separate service provider in accordance with the embodiment of the present invention. Similar to FIGS. 6A and 6B, voice profiles of the caller, the callee, the caller's version of the callee's voice profile, and the callee's version of the caller's voice profile may be provided, maintained, and updated during a call conversation. However, in this example, the voice profiles are maintained, provided and updated by a service provider 610. The service provider 610 may be the service provider of one or both of the caller and the callee or alternatively, an independent third party service provider that provides the service of managing, providing, and updating voice profiles. Additionally, a service provider may provide, manage, and update voice profiles for one client while the other client maintains, updates and provides voice profiles without use of a service provider.

In this example, we will again discuss the illustration of the caller using VoIP device 606 to establish a call with a callee that uses VoIP device 608. At an initial point, the caller's VoIP device 606 generates a call request that identifies the caller and the callee which is transmitted to both the service provider 610 and the callee's VoIP device 608. As discussed above, selection and use of voice profiles may be accomplished at the initiation of a call between two individuals or during the call after the individuals have been identified.

The service provider 610, upon receipt of a call request from the caller's VoIP device 606, the service provider identifies the caller's version of the callee's voice profile and the callee's version of the caller's voice profile. Upon identification of the respective versions of the voice profiles, the service provider 610 may determine if the respective versions are current and if not, update the versions. Similar to the discussion above, if one of the voice profiles is not current, the service provider 610 may merge a shared voice profile, or another version of the voice profile, with the identified voice profile. For example, if the caller's version of the callee's voice profile is not current, the service provider 610 may merge that voice profile with the callee's shared voice profile. Alternatively, a single voice profile may be maintained for each individual and kept current by the service provider for delivery to anyone communicating with that individual.

The service provider 610 provides to the caller's VoIP device 606 the caller's version of the callee's voice profile. Likewise, the service provider 610 provides to the callee's VoIP device 608, the callee's version of the caller's voice profile. If versions of the profiles do not exist the service provider 610 may provide a shared voice profile for the caller or the callee. The shared voice profile may be a profile created by another client or created by the caller or callee.

Referring now to FIG. 7B, the respective VoIP client devices 606 and 608 utilize the received voice profiles to filter and improve the incoming speech data. For example, the caller's VoIP device 606 applies the caller's version of the callee's voice profile to filter and improve the incoming speech data received from the callee. Likewise, the callee's VoIP device 608 applies the callee's version of the caller's voice profile to filter and improve the speech data received from the caller's VoIP device 606. Application of voice profiles may be automatic or manually selected.

During the conversation, the VoIP clients 606 and 608, and optionally the service provider 610, may actively, or in the background, obtain speech data samples for use in updating the respective versions of the voice profiles. For example, the caller's VoIP device 606, in response to active input from the caller, or in the background, collects samples of the callee's incoming speech data for use in updating the caller's version of the callee's voice profile. Likewise, the callee's VoIP device 608 may actively, or in the background, collect samples of the caller's speech data for use in updating the callee's version of the caller's voice profile. Additionally, the service provider 610 may obtain samples of both the caller's and the callee's speech data for use in updating the respective voice profiles.

Referring now to FIG. 7C, upon termination of the conversation between the caller's VoIP device 606 and the callee's VoIP device 608, the communication channel is terminated and each of the devices provide to the service provider 610, the sampled audio that has been collected. Alternatively, during the conversation between the caller and the callee, the VoIP clients may intermittently provide to the service provider 610 the audio data samples that have been collected up to that point. In addition, for security reasons and to free-up memory, the VoIP client devices may remove the respective voice profiles that were received from the service provider 610 and used during the conversation. Additionally, the service provider 610, upon receipt of the audio samples from the caller's VoIP device 606 and the callee's VoIP device 608 may update the respective voice profiles of the caller and the callee, as described in more detail below.

While embodiments of the present invention have been discussed as using voice profiles in a two-party communication, embodiments are equally applicable to multi-party communications. In such an example, the header of data packets may specify the individual whose speech in contained in the payload, thereby identifying to the receiving VoIP device(s) which voice profile is to be applied to the incoming speech data.

Figure 8:
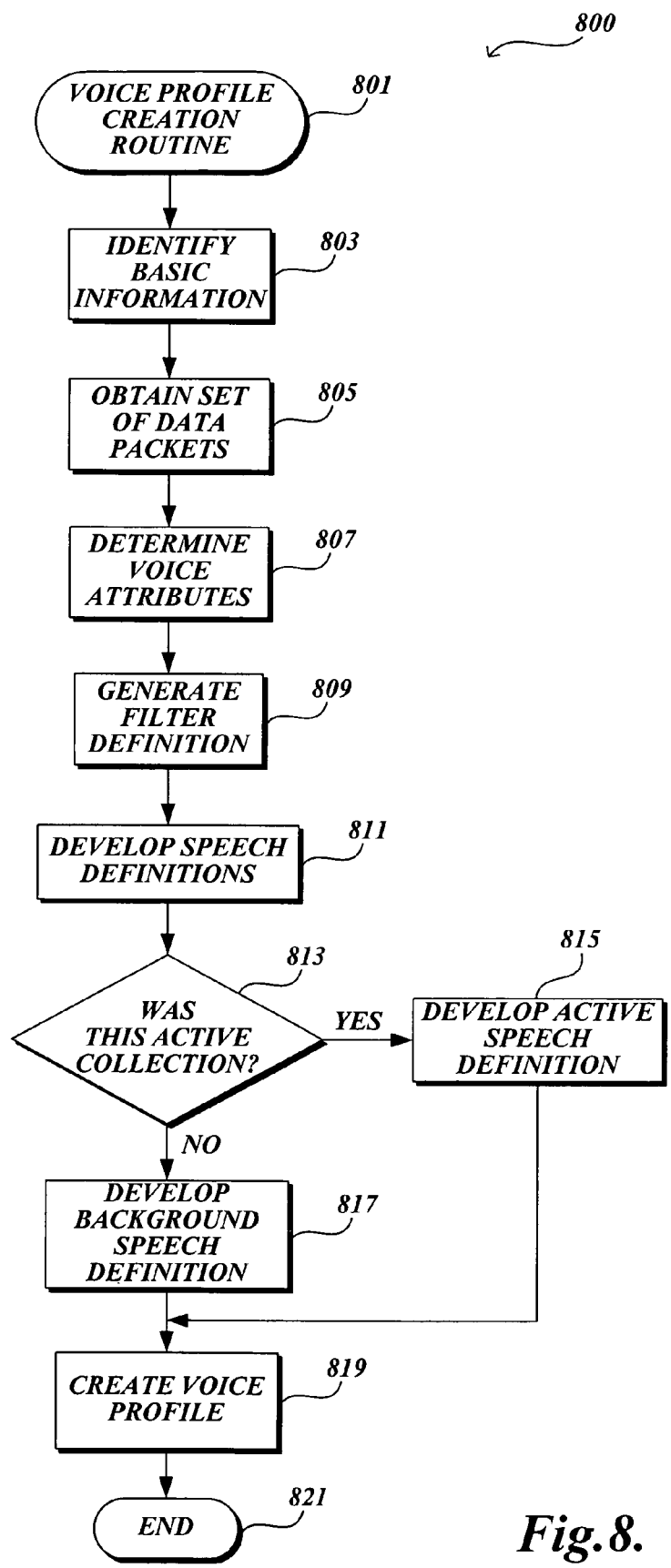
FIG. 8 is a flow diagram of a voice profile creation routine for creating a voice profile in accordance with an embodiment of the present invention.

FIG. 8 is a flow diagram of a voice profile creation routine for creating a voice profile in accordance with an embodiment of the present invention. The voice profile creation routine 800 begins at block 801 and at block 803 basic information about the user creating the voice profile is identified. Basic information may include, but is not limited to, the individual's name for which the voice profile is being created, the unique VoIP identifier of the client with which the individual is associated, the date of creation of the voice profile, the attributes of the device(s) associated with the client (VoIP client), such as equipment ID, rules as to how the created voice profile may be used/shared, etc.

Upon identification of basic information, at block 805 a set of audio data packets is obtained that will be used for generating a voice profile for the individual. Collection of data packets and creation of a voice profile may be accomplished, for example, upon activation and setup of a VoIP account. Using the set of data packets, at block 807 voice attributes for the user are determined. Voice attributes include, but are not limited to, the frequency range and/or amplitude range within which the individual speaks.

A block 809, filter definitions based on the voice attributes are created for the user. The filter definition may include the high limit and low limit of the frequency range for which audio is to be allowed and the amplitude range for which audio is to be allowed. The filter definitions are included in the individual's voice profile and may be used by a device to filter-out audio that is being received from that individual.

Any audio falling outside of either range may be removed from the audio prior to reproduction by the VoIP device.

At block 811, a speech definition including a digital representation of the phonetic sounds extracted from the set of data packets provided by the individual is developed. While phonetics are being used as an example, any type of speech representation technique may be used with embodiments of the present invention. Because each individual speaks a little differently, each will have a unique speech definition that includes digital representations of phonetic sounds of the language being spoken by that individual. As will be appreciated by one of skill in the art of phonetics, a speech definition may include phonetic sounds from many different languages for multi-lingual individuals.

At decision block 813, a determination is made as to whether the set of data packets were actively collected or collected in the background of a speech conversation. Active collection may be collection of data samples in response to an individual requesting that specific samples be recorded or in response to a specific voice profile setup routine. For example, if a new user is creating a VoIP account, as part of the account setup, the system may request that the individual read a particular paragraph of text so that data samples may be actively obtained. Alternatively, if collection is done in the background, the system may intermittently sample data packets containing audio during a speech conversation in which the individual is speaking.

Figure 12:
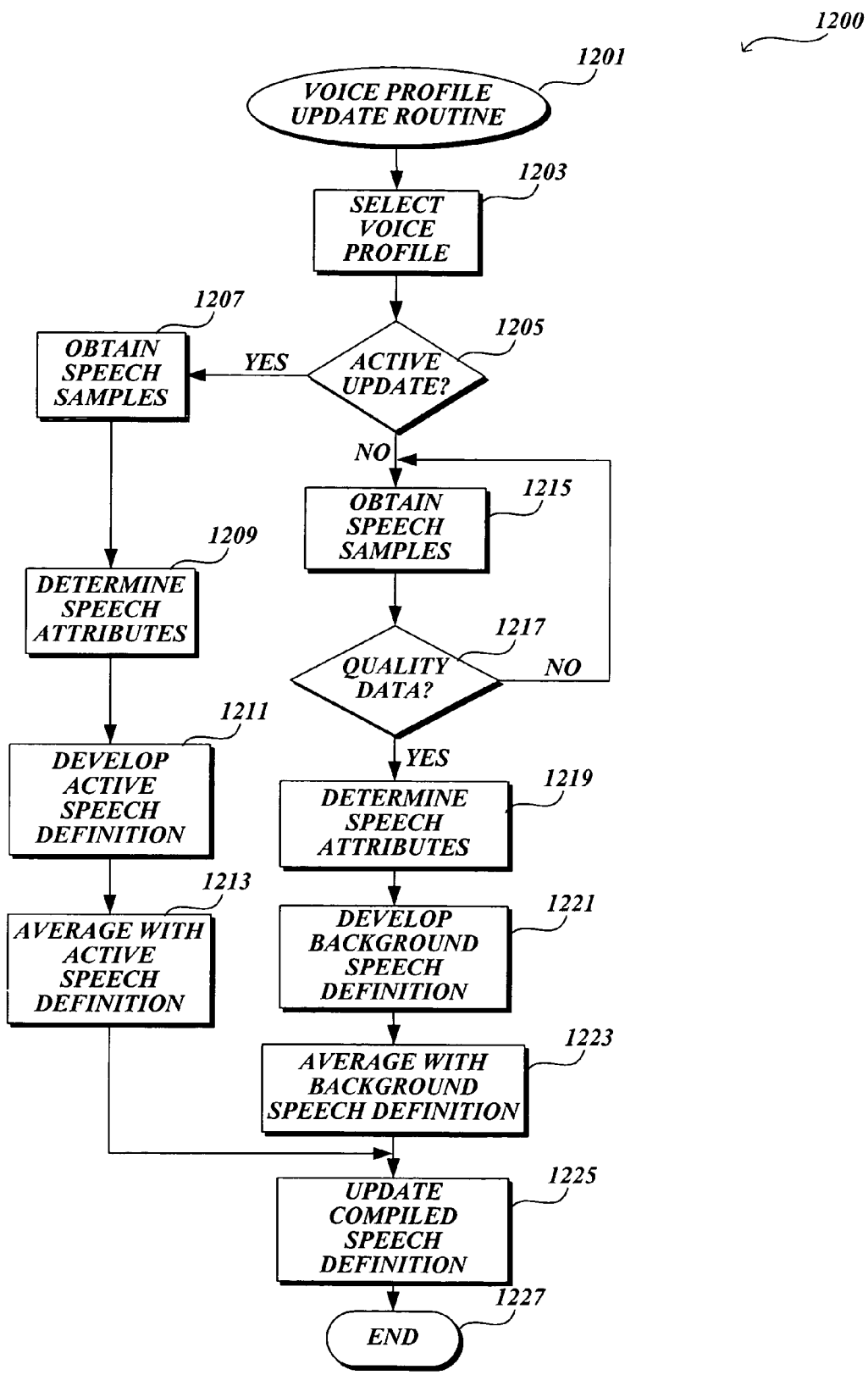
FIG. 12 is a voice profile update routine for updating voice profiles in accordance with an embodiment of the present invention.

If it is determined at decision block 813 that the collection of data packets was active, at block 815 an active speech definition is developed based on the phonetic speech representations extracted from those data packets. However, if it is determined at decision block 813 that the collection was not active, at block 817 a background speech definition is generated. Upon creation of the filter definitions at block 809 and after generation of either a background speech definition at block 817 or generation of an active speech definition at block 815, a voice profile for the user is created at block 819 that contains the basic information of the individual, the filter definitions and the created speech definition. Additionally, an empty entry for the speech definition that was not created may also be established and included in the voice profile. The empty speech definition may be later populated with data during a voice profile update routine (FIG. 12). Additionally, a compiled speech definition may be generated and maintained in the voice profile, for use in filtering speech data. As described in more detail below, a compiled speech definition is a speech definition generated from a merging of a background speech definition and an active speech definition. During the voice profile creation routine, the compiled speech definition will resemble the speech definition created at either blocks 817 or 815. At block 821, the routine 800 completes.

Figure 13B:
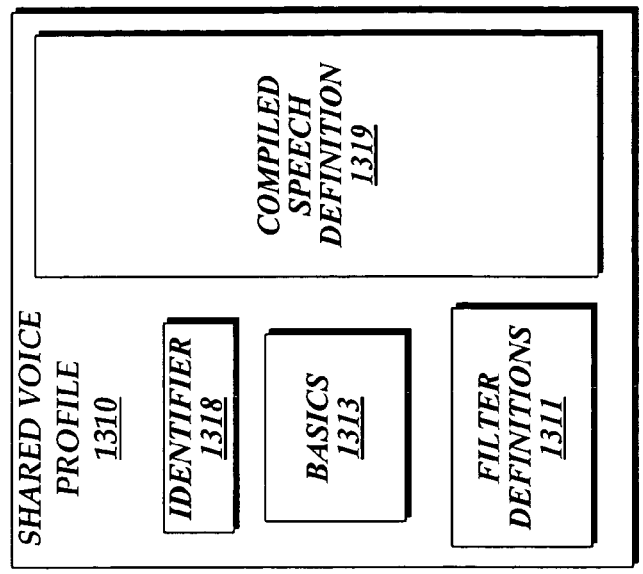
FIGS. 13A and 13B are block diagrams of voice profile generated, maintained, and used in accordance with embodiments of the present invention.
Figure 13A:
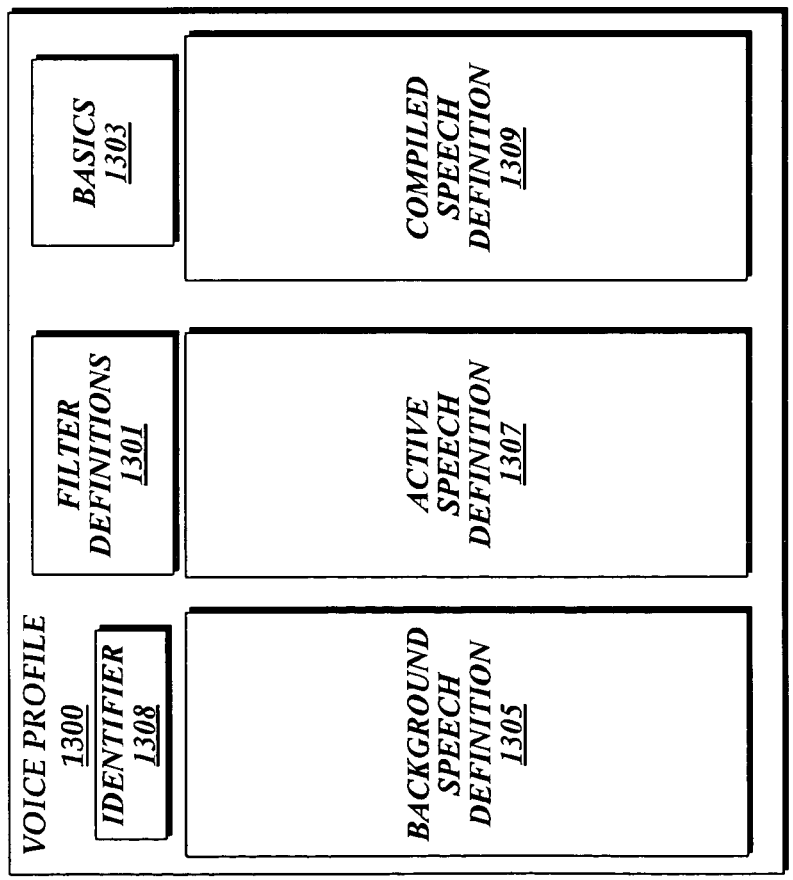

FIG. 13A is a block diagram of a voice profile generated utilizing the routine described with respect to FIG. 8. The voice profile 1300 may include the basics 1303 regarding the individual for whom the voice profile is to be applied. Additionally, filter definitions 1301 specifying the frequency and amplitude ranges of the individual may be defined for use in filtering out unwanted noise. Additionally, as described herein, a background speech definition 1305, active speech definition 1307, and compiled speech definition 1309 may be maintained and adjusted over time as the voice profile is updated. The compiled speech definition may be a weighted average of the background speech definition 1305 and the active speech definition 1307 in which the active speech definition 1307 is given more weight during the averaging.

FIG. 13B is a block diagram of a shared voice profile that may be transmitted from one device to another for use in filtering and improving incoming speech data in accordance with an embodiment of the present invention. The shared voice profile 1310 is a simplified version of the voice profile 1300. In particular, the shared voice profile may only include the basics 1313, the filter definitions 1311 and the compiled speech definition 1319. If the shared voice profile 1310 is being transmitted to a device that includes another version of the voice profile the two voice profiles may be merged, as discussed in more detail below with respect to FIG. 11. However, if the shared voice profile 1310 is transmitted to a device that does not include another version of the voice profile, the shared voice profile 1310 may be converted into a voice profile by the receiving device, by the addition of an empty background speech definition and an active speech definition. The created speech definition may be further updated by the party receiving speech from the individual identified by the voice profile to create a unique version of the voice profile based on the receiving party's perception of the speaking individual's speech patterns.

Figure 9:
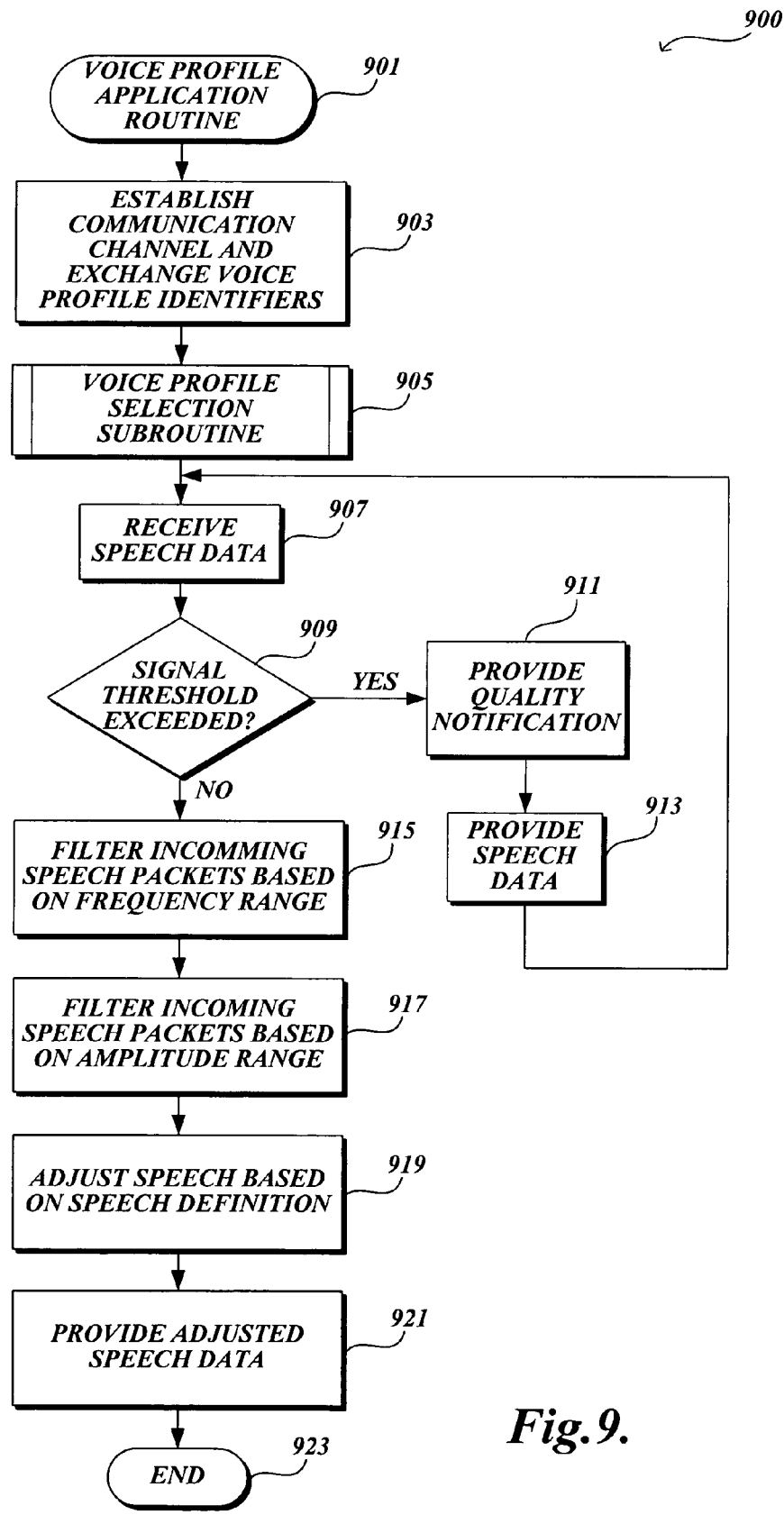
FIG. 9 is a flow diagram of a voice profile selection and application routine for selecting and applying voice profiles to incoming audio data packets in accordance with an embodiment of the present invention.

FIG. 9 is a flow diagram of a voice profile selection and application routine for selecting and applying voice profiles to incoming audio data packets in accordance with an embodiment of the present invention. The voice profile selection and application routine 900 begins at block 901. At block 903 a communication channel is established and during that establishment or at some point thereafter, an exchange of voice profile identifiers between the VoIP devices engaged in the communication occurs. This exchange may be done automatically and unknown to the individuals of the conversation. Upon exchange of voice profile identifiers, the voice profile selection subroutine 905 is performed, as described in more detail with respect to FIG. 10. As described below, completion of the voice profile selection subroutine 905 returns a selected voice profile for use in filtering and improving incoming speech data.

Upon return of a selected voice profile, at block 907 speech data is received on an incoming communication channel. At decision block 909, a determination is made as to whether the signal quality of the incoming speech data is beyond a specific threshold. If the incoming speech quality is beyond a predetermined threshold (i.e., the signal quality is very poor), it may be desired not to use the voice profile to filter and improve the speech quality because the application may result in incorrect improvement and further degraded speech. If it is determined at decision block 909 that the signal quality of the incoming speech data is beyond a predetermined threshold, at block 911 the individual's involved in the conversation are notified of the signal quality problem and at block 913 the unimproved, original, incoming speech data is reproduced to the individual using the VoIP device. After the speech data is provided at block 913, the routine 900 returns to block 907 and continues. Alternatively, if it is determined at decision block 909 that the speech quality is beyond a predetermined threshold, the communication may be terminated and optionally reestablished, in an effort to obtain a better signal quality.

If it is determined at decision block 909 that the incoming signal quality of the speech is not beyond a predetermined threshold, at block 915 the incoming speech is initially filtered based on the frequency range identified in the voice profile that is being applied to the incoming speech. Filtering of the audio based on a frequency range removes unwanted background noise and other interference outside the frequency range. This may be background noise or transmission errors resulting in auditory noise. For example, if the speaking individual is in a crowded room, background noise from the room may be included in the transmitted audio data. The initial filtering based on a frequency range of the speaking individual's voice profile will remove the noise outside the determined frequency range.

In addition to filtering the incoming audio based on a frequency range defined by the voice profile being applied, at block 917 the incoming audio packets are filtered based on an amplitude range defined by the applied voice profile. Similar to filtering based on a frequency range, filtering based on an amplitude range removes additional unwanted noise that is within the frequency range but not within the amplitude range of the speaking individual's voice profile.

After filtering incoming speech data based on frequency and amplitude ranges defined by the voice profile, at block 919 the remaining speech is improved using the speech definition contained in the applied voice profile. Each phonetic sound of the incoming speech is identified and compared with the appropriate phonetic of the speech definition. The matching data from the speech definition is used to recreate the phonetic sound, as collected from the speaking individual during creation/update of the voice profile. At block 921, the filtered and improved speech is reproduced on the receiving VoIP device and the routine 900 completes as illustrated by block 923.

Figure 10:
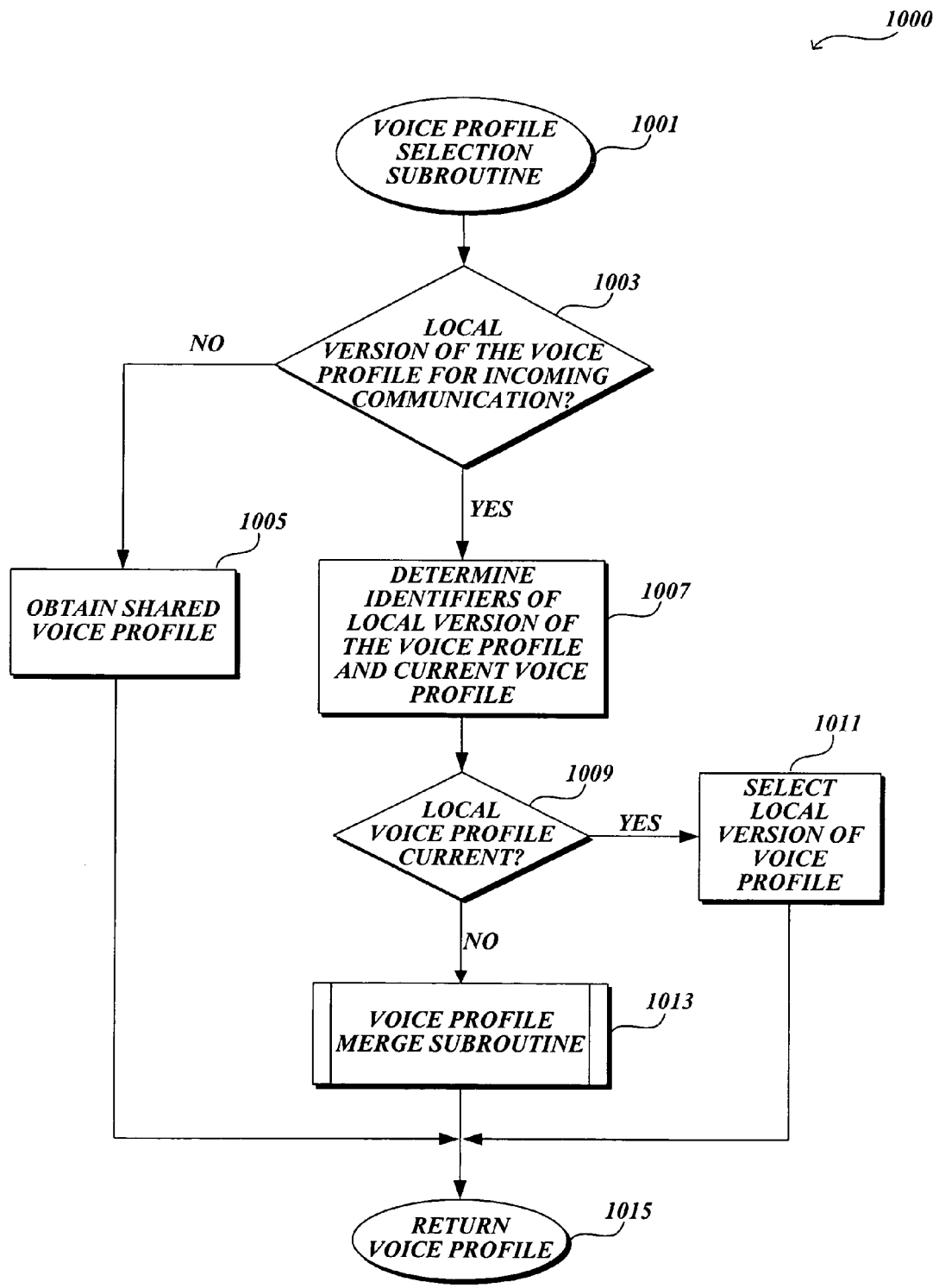
FIG. 10 is a voice profile selection subroutine used for selecting a voice profile to be applied to incoming speech in accordance with an embodiment of the present invention.

FIG. 10 is a voice profile selection subroutine 1000 used for selecting a voice profile to be applied to incoming speech in accordance with an embodiment of the present invention. The voice profile selection subroutine 1000 begins at block 1001, and at block 1003, a determination is made as to whether a voice profile exists on the receiving client that may be appropriately applied to the incoming speech (referred to herein as a local version of the voice profile). As discussed above, during establishment of the communication connection, the individual from which audio will be received is identified and a determination may be made as to whether a local version of that individual's voice profile already exists on the device that will be receiving the audio. At decision block 1003, if it is determined that a local version of the voice profile does not exist, at block 1005, a shared version of the voice profile is obtained from a remote location (e.g., the transmitting device or a service provider).

However, if it is determined at decision block 1003 that a local version of the voice profile currently exists that may be applied to the incoming digital audio, at block 1007, an identifier of the local version of the voice profile and the voice profile that is available from either the calling party or a service provider is determined. At decision block 1009, the identifiers of the voice profiles are compared and a determination is made as to whether the local version of the voice profile is current. If it is determined at decision block 1009 that the local version of the voice profile is current, at block 1011 the local version of the voice profile is selected for use in filtering and improving the incoming audio. However, if it is determined at decision block 1009 that the local version of the voice profile is not current, the voice profile merge subroutine, as illustrated by subroutine block 1013, is performed. The voice profile merge subroutine is described in more detail with respect to FIG. 11. Upon completion of the voice profile merge subroutine, upon selection of a local voice profile at block 1011, or upon obtainment and selection of a shared voice profile at block 1005, the voice profile selection subroutine 1000 returns the appropriately selected voice profile and completes, as illustrated by block 1015.

Figure 11:
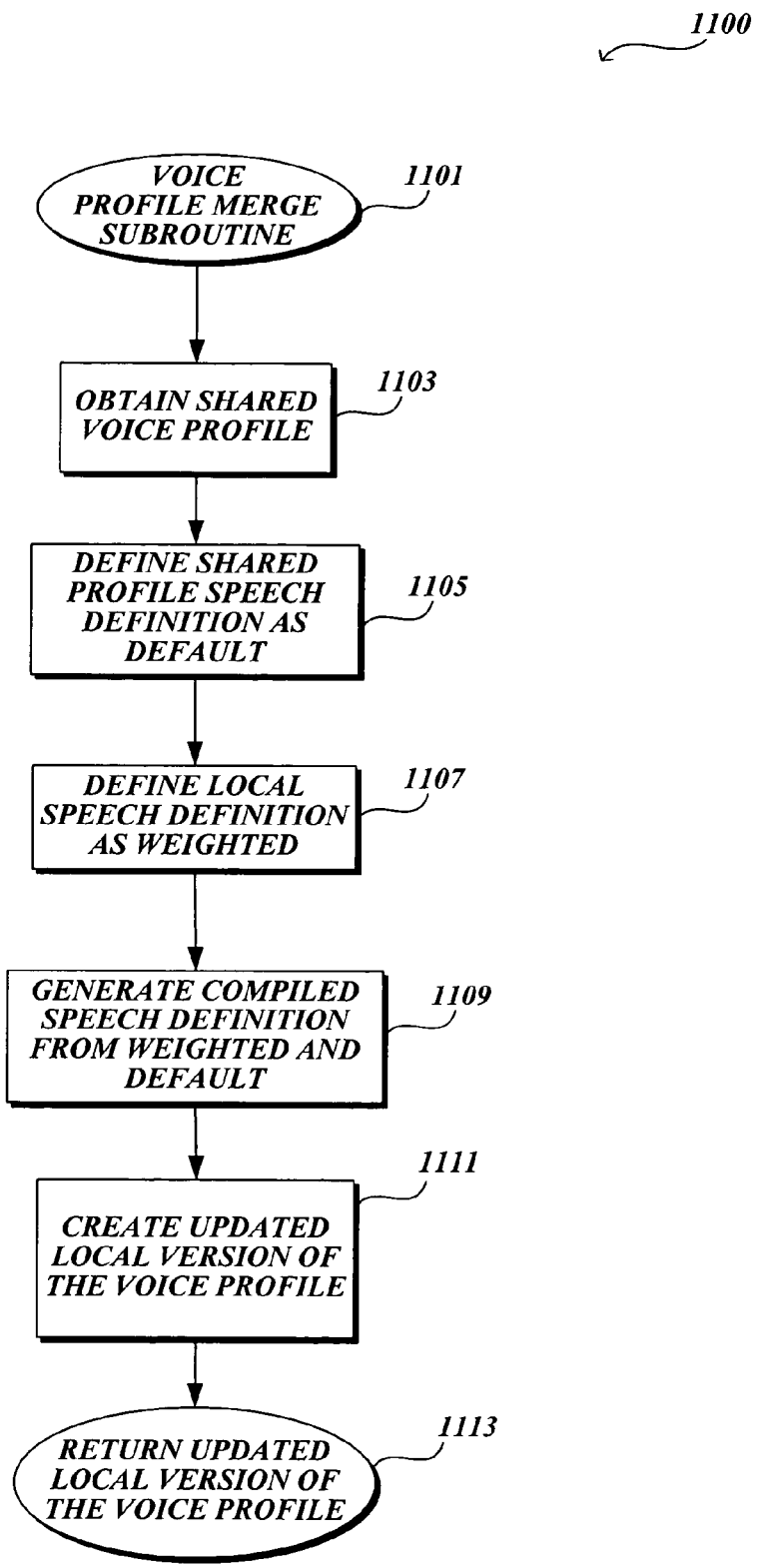
FIG. 11 is a flow diagram of a voice profile merge subroutine for merging a local version of a voice profile with a received shared voice profile to obtain a new local version of the voice profile in accordance with an embodiment of the present invention.

FIG. 11 is a flow diagram of a voice profile merge subroutine for merging a local version of a voice profile with a received shared voice profile to obtain a new local version of the voice profile in accordance with an embodiment of the present invention. The voice profile merge subroutine 1100 begins at block 1101. At block 1103, a shared voice profile is obtained. As discussed above, a shared voice profile may be obtained from the client transmitting the speech that is to be filtered and improved using the voice profile, or from a service provider.

At block 1105, the speech definition contained in the received shared voice profile is defined as a default speech definition. At block 1107, the compiled speech definition contained in the local version of the voice profile is defined as the weighted speech definition. Utilizing the default speech definition and the weighted speech definition, a compiled speech definition is generated by merging the two speech definitions. The weighted speech definition may be given a higher priority (or weight) in merging such that the digital representations of the phonetic speech defined by the weighted speech definition are maintained to a higher degree than those of the default speech definition. As discussed above, the compiled speech definition that is originally part of the local voice profile includes what the receiving individual perceives to be an accurate representation of the speaking persons voice. This speech definition should be maintained to a higher degree than that of a speech definition received in a shared voice profile. The speech definition in a received shared voice profile may be generated using background collection or based on the speaking individual's perception as to what is representative of their voice.

Upon generation of a new compiled speech definition at block 1111 an updated local version of the voice profile is created by clearing the background speech definition and the active speech definition and utilizing the new compiled speech definition. Additionally, the filter definitions and basics may be updated based on the filter definitions and basics contained in the received shared voice profile. The updated local version of the voice profile created at block 1111 is returned to the voice profile selection subroutine 1000 described above, as illustrated in block 1113, and the routine 1100 completes.

FIG. 12 is a voice profile update routine for updating voice profiles in accordance with an embodiment of the present invention. The voice profile update routine 1200 begins at block 1201 and at block 1203 a voice profile is selected. A voice profile selected for use during a conversation for filtering and improving incoming speech may be updated either actively or in the background. Alternatively, a voice profile may be selected by the user in response to a request to actively update the voice profile. At decision block 1205, a determination is made as to whether the update to be performed on the selected profile is an active update. An active update may be identified by a user selecting a portion of speech that they wish to use in updating the profile. Alternatively, an active update may be identified in response to a user requesting to actively update their voice profile by providing speech that is specific for the update process.

If it is determined at decision block 1205 that the update is active, at block 1207 the speech samples that are to be used in updating the voice profile are obtained. At block 1209, the obtained speech samples are analyzed to determine the speech attributes including, but not limited to, the frequency range in which the user speaks, and the amplitude range. Upon determining the speech attributes and possibly adjusting the currently defined speech attributes for the voice profile, at block 1211 an active speech definition is generated based on the phonetics of the sampled speech. At block 1213, the newly developed active speech definition is averaged with the existing active speech definition maintained in the voice profile. If this is the first time an active speech definition has been developed, it will simply be used as the active speech definition of the voice profile.

Returning to decision block 1205, if it is determined that the update is not active, at block 1215 speech samples are obtained in the background during a current speech conversation. At decision block 1217, a determination is made as to whether the obtained speech samples are within a predetermined quality threshold range. For example, a quality threshold range may be determined based on the signal quality of the incoming speech data. If it is determined at decision block 1217 that the quality of the speech samples is not sufficient, the routine 1200 returns to block 1215 and obtains a new set of speech samples. However, if it is determined at decision block 1217 that the quality of the speech samples is sufficient, at block 1219 the speech attributes are determined. In addition to determining the speech attributes and possibly updating the filter definitions in the existing voice profile, at block 1221 a background speech definition is developed based on the phonetics contained in the sampled speech. Utilizing the developed background speech definition, the stored background speech definition is averaged with the new information, as illustrated by block 1223, to define a new background speech definition that is associated with the voice profile. If this is the first time a background speech definition has been created, it is simply used as the background speech definition for the voice profile.

Upon averaging the active speech definition at block 1213 or averaging the background speech definition at block 1225, a compiled average for the voice profile is updated, as illustrated by block 1225. As discussed above, the compiled average may be a weighted average between the active speech definition and the background speech definition in which the active speech definition is given more weight in computing the compiled average. Upon updating the compiled average at block 1225, the voice profile update routine 1200 completes, as illustrated by block 1227.

In an alternative embodiment, instead of maintaining an active speech definition, a background speech definition, and a compiled speech definition, the voice profile may only contain the compiled speech definition. Each time a new speech definition is generated during an update, either active (1211) or background (1221) the maintained compiled speech definition and the new speech definition may be averaged to generate a new compiled speech definition. In such an embodiment, the new active speech definition may be given more or equal weight when averaging the two speech definitions. Likewise, if the new speech definition is a background speech definition it may be given equal or less weight than the maintained compiled speech definition.

While illustrative embodiments have been illustrated and described, it will be appreciated that various changes can be made therein without departing from the spirit and scope of the invention.

The invention claimed is:

1. A computer-readable medium having computer executable components executing instructions for creating and maintaining and updating a voice profile, comprising:
   selecting a voice profile containing a first speech definition;
   determining whether an update is active,
      in response to determining that the update is active,
      collecting a plurality of data packets containing digital representations of speech;
      generating a filter definition based on information contained in the plurality of collected data packets;
      analyzing the digital representations of speech contained in the plurality of collected data packets and generating a second speech definition representative of the digital representations of speech,
      averaging the second speech definition and the first speech definition to create a compiled speech definition, and
      in response to a determination that the update is not active, collecting speech during a first speech conversation,
      determining speech attributes,
      developing a second speech attribute definition based on background speech, and
   averaging the second background speech attribute definitions and a current background speech attribute definition to create a compiled speech definition.

2. The computer-readable medium of claim 1, wherein the voice profile is used to filter and improve the digital representations of speech.

3. The computer-readable medium of claim 1, wherein the filter definition includes a frequency range.

4. The computer-readable medium of claim 3, wherein the frequency range may be applied to data packets containing digital representations of speech to remove information outside the frequency range.

5. The computer-readable medium of claim 1, wherein the filter definition includes an amplitude range.

6. The computer-readable medium of claim 5, wherein the amplitude range is applied to data packets containing digital representations of speech to remove information outside the amplitude range.

7. The computer-readable medium of claim 1, wherein the speech definition is applied to data packets containing digital representations of speech to improve the digital representations of speech.

8. The computer-readable medium of claim 1, wherein the speech definition is an active speech definition if the plurality of collected data packets were actively collected.

9. A method for improving digitally transmitted speech, comprising:
   selecting a voice profile for use in improving the digitally transmitted speech between a first individual and a second individual during a conversation, wherein selecting the voice profile comprises:
      determining whether the voice profile is a local version for application to receive digitally transmitted speech,
      in response to determining that the voice profile is not a local version, obtaining the voice profile from a remote location,
      in response to determining that the voice profile is a local version,
         determining identifiers from the local version of the voice profile, and
         determining whether the voice profile is current; and
   improving received digitally transmitted speech by applying the selected voice profile.

10. The method of claim 9, wherein selecting the voice profile includes: receiving the voice profile for application to received digitally transmitted speech.

11. The method of claim 10 wherein the received voice profile is a shared voice profile.

12. The method of claim 10, wherein the voice profile is received from an individual whose speech is represented by the received voice profile.

13. The method of claim 10, wherein the voice profile is received from a service provider.

14. The method of claim 9 wherein improving received digitally transmitted speech includes: filtering the received digitally transmitted speech to remove audio data outside of a frequency range.

15. The method of claim 9 wherein improving received digitally transmitted speech includes: adjusting a digital representation of the received digital speech by replacing the received digital representations of speech with corresponding digital representations of speech included in the voice profile.

16. The method of claim 9, wherein determining that the voice profile is current comprises selecting the local version of the voice profile.

17. The method of claim 9, wherein determining that the voice profile is not current comprises merging the local version of the voice profile with the shared voice profile.

18. A computer-implemented method for updating a voice profile, the method comprising:

selecting a voice profile containing a first speech definition;

determining whether an update is active, in response to determining that the update is active, collecting data packets containing digital representations of speech, developing a second speech definition based on the digital representations of speech, and averaging the second speech definition and the first speech definition to create a compiled speech definition, and in response to determining that the update is not active, collecting speech during a first speech conversation, determining speech attributes, developing a second speech attribute definition based on background speech, and averaging the second background speech attribute definitions and a current background speech attribute definition to create a compiled speech definition.

19. The method of claim 18, wherein the second speech definition is an active speech definition; and wherein averaging the second speech definition and the first speech definition includes: weighting the second speech definition such that it is retained to a higher degree during the averaging.

20. The method of claim 18, wherein the compiled speech definition is used to improve digital representations of speech received from an individual represented by the voice profile.

* * * * *